(No Model.) 2 Sheets—Sheet 1.
J. A. AIKEN.
DEVICE FOR FORMING THE ENDS OF HANDLES.
No. 476,220. Patented May 31, 1892.
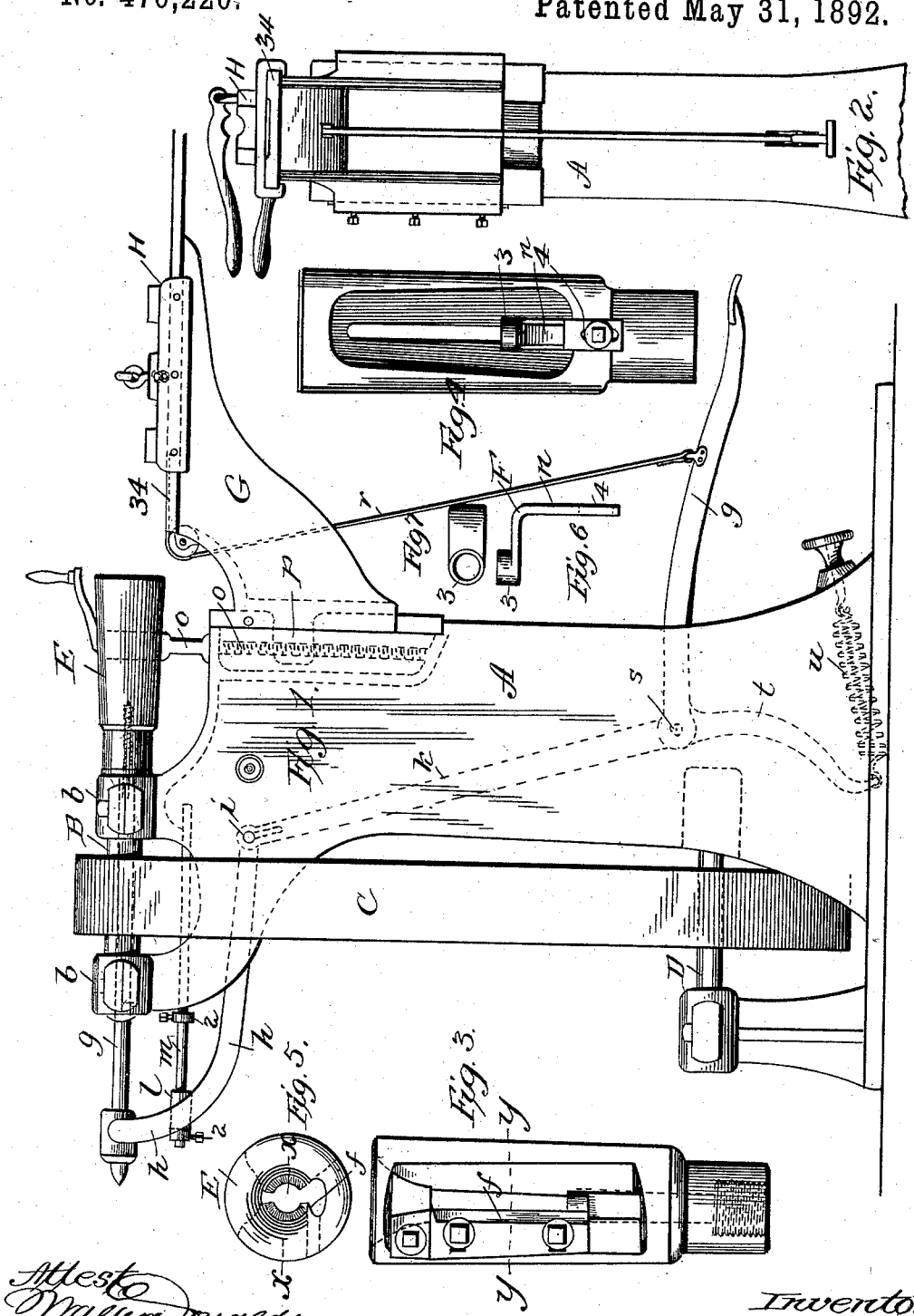
Inventor
James A. Aiken
by Ellis Spear
Atty.

(No Model.) 2 Sheets—Sheet 2.
J. A. AIKEN.
DEVICE FOR FORMING THE ENDS OF HANDLES.
No. 476,220. Patented May 31, 1892.
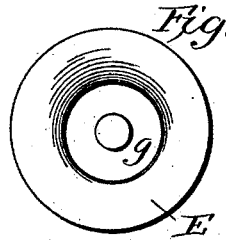
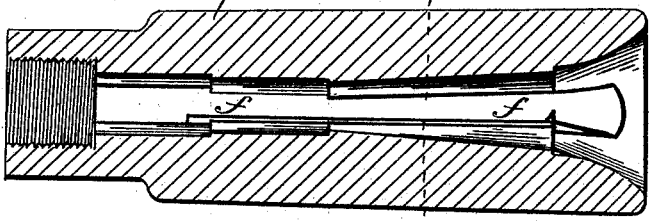
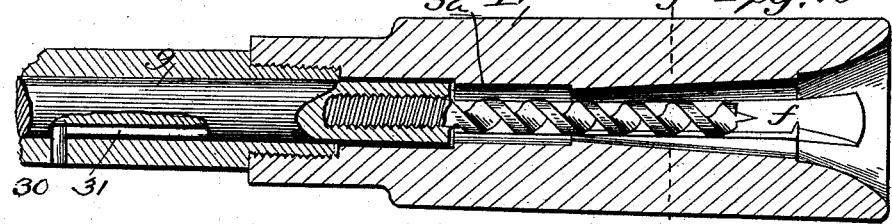
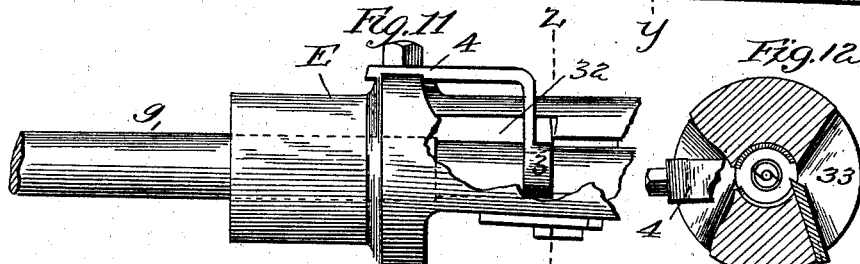
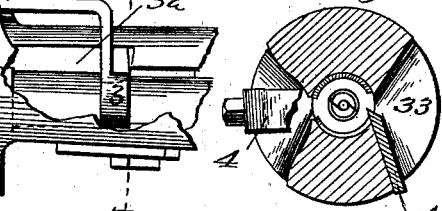
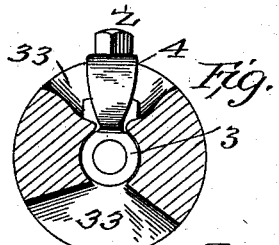
Attest
Walter Donaldson
I. E. Middleton
Inventor
James A. Aiken
by Ellis Spear
Att.

UNITED STATES PATENT OFFICE.

JAMES A. AIKEN, OF JACKSON, MICHIGAN.

DEVICE FOR FORMING THE ENDS OF HANDLES.

SPECIFICATION forming part of Letters Patent No. 476,220, dated May 31, 1892.

Application filed October 10, 1891. Serial No. 408,397. (No model.)

*To all whom it may concern:*

Be it known that I, JAMES A. AIKEN, a citizen of the United States of America, residing at Jackson, in the county of Jackson and State of Michigan, have invented certain new and useful Improvements in Devices for Forming the Ends of Handles, of which the following is a specification.

My invention relates to improvements in devices for forming the end of handles for various articles and forming at the same time the sockets in said handles. A device of this character is shown in Letters Patent of the United States granted to me on the 13th day of May, 1890, and numbered 427,821. The cutter-head shown in the said patent and adapted to form the end of the handle and fit it for the socket or thimble is the same as that herein shown; but in the said patent the thimble in which the bit is held is fixed by a set-screw and serves as a stop against which the end of the handle bears in the operation of cutting and shaping. When the diameter of the bit is considerably less than the diameter of the end of the handle, so that there remains after the completion of the taper and the hole a blunt annular edge upon the end of the taper, no serious difficulty occurs in the machine shown in the patent; but when the annular end of the handle is reduced to a thin edge it is liable to be frayed or split, and so seriously injured when it comes in contact with the solid forward end of the thimble which holds the bit. To remedy this and further to provide for the better escape of the auger shavings and to prevent them from working into and splitting the end of the handle, I have provided an improved form of stop and formed an open space behind the stop so as to allow the shavings to worm through the mouth of the stop and to have free clearance in the open space behind it. I have also reorganized the machine in which this chuck is used, as herein explained, so that it may be used in different ways.

My invention is illustrated in the accompanying drawings, in which—

Figure 1 is a side elevation of the whole machine. Fig. 2 is a rear elevation, the base being broken away. Fig. 3 is a top view of the cutter-shell; Fig. 4, a side elevation thereof, and Fig. 5 an end view of the same on a larger scale than that shown in Fig. 1. Figs. 6 and 7 show the stop detached. Fig. 8 is a front end view of the cutter-shell. Fig. 9 is a horizontal section on line $xx$ of Fig. 5. Fig. 10 is a similar view with the bit and its shank in place. Fig. 11 is a detail view, partly broken away, showing the stop 3 in place. Fig. 12 is a sectional view on line $yy$ of Figs. 3, 9, and 10, looking toward the point of the bit. Fig. 13 is a section on line $zz$, Fig. 11, showing the stop in place.

In the drawings, A represents the standard of the machine, which supports the working parts. The main shaft of the cutter-shell (marked B) has its bearings at $bb$, and is provided with a pulley over which runs a belt C, driven by pulley on the driving-shaft D or by any suitable connections. The cutter-shell E is fixed on the forward end of the shaft B. It is hollow and flares outward, as shown in my said patent, corresponding in shape to the shape required on the end of the handle, and the knife is set in the opening in the side of the shell, as shown at $f$, Fig. 3, and it has a spur at the end to cut the shoulder at the beginning of the taper upon the handle.

The shaft B is tubular, and the shank or thimble of the bit placed in the center is compelled to rotate with the shaft by means of a key 30, passing through the tubular shaft and through a slot 31 in the shank. The shank of the bit, which is marked $g$ in Fig. 1, extends to the rear and is fixed to an arm $h$, connected at $i$ to an operating-arm $k$. The arm $h$ has a collar 1, which slides upon a rod $m$, fixed to the frame, and the movement of the shank is limited by adjustable collars 2 upon the rod $m$. These collars may be so set as to hold the shank in fixed position.

The cutter-shell E is chambered out at 32 in rear of the taper to receive the thimble 3 of the stop F. This stop has an arm $n$, bent so as to lie upon the outside of the shell when the thimble is in its proper position arranged axially in the shell. It is slotted, as shown at 4, and is held to the cutter-head by means of a set-screw in a hole tapped in the shell, so that the stop may be adjusted longitudinally on the shell. There is a sufficient space in the chamber in rear of the thimble, with a lateral opening 33, to allow for the escape of shavings, which work to the rear through the enlarged opening in the thimble between its inner surface and the periphery of the bit or its shank. The forward end of the thimble 3 may be formed slightly flaring or rounded in the inside to admit the end of the handle.

The front end of the machine is provided with an arm G, which is carried upon the standard A, being adjusted vertically thereon by means of a screw $o$, threaded through a spur $p$ on the inner end of the arm G, the screw turning in bearings in the standard A. On the upper side of the arm G are horizontal guideways 34, on which slides the carriage-clamp H, which carries the handle. This is shown in Figs. 1 and 2. This sliding clamp is connected to a treadle $g$ by a strap $r$ or by any convenient means, so that the depression of the treadle draws the clamp toward the chuck. The treadle forms with the arm $k$ a bell-crank lever, which is pivoted at $s$ on a standard A; but it is also provided with another arm $t$, projecting downward, with a spring $u$, by means of which the treadle is normally held up, with the arm $k$ thrown to the rear. A depression of the treadle will move, therefore, with the connection shown, both the bit and the sliding handle-holder or carriage.

The machine is capable of four distinct modes of operation. The first has been above indicated, and in this the connections are as shown in Fig. 1. In this at the start the bit should rest just behind the stop, the bit and the shell revolving together, and both the bit and the carriage or handle-holder move simultaneously toward each other.

In the second mode the strap may be removed and the handle-holder may be pushed forward by the workman while the depression of the treadle brings forward the bit. By this method it is intended to chuck the handle first and then while it remains in the shell, after it has been externally formed, to bring forward the bit and bore the hole.

In the third method the bit-shank is disconnected from the treadle (if the treadle is used) and the bit is set forward in its most advanced position and there fastened by the collars 2. The handle is then placed in the holder and the latter pushed forward to advance the handle against the bit and the cutter in the shell.

As a fourth method of using the machine, the bit may be retracted or removed, and the method can be used for forming the exterior of the handle without boring.

I claim as my invention—

1. In combination, the cutter-shell, the bit, and the stop around the bit, the said parts being constructed and arranged to leave a space to the rear for the escape of the shavings, substantially as described.

2. In combination, the cutter-shell, the bit, and the stop around the bit, the said stop having a seat at its forward end to receive the end of the handle and prevent the same from splitting, substantially as described.

3. In combination with the cutter-shell mounted upon a tubular shaft, a bit mounted upon a shank arranged axially in the shaft and having a stop combined therewith, all substantially as described.

4. In combination with the cutter-shell, the stop having a tubular form and arranged about the bit and provided, also, with the shank adjustably connected to the shell, substantially as described.

5. In combination with a cutter-shell and its tubular shaft, the bit and its shank arranged axially therein and connected to the shaft so as to revolve therewith and capable of reciprocating motion therein, and means for moving the bit longitudinally, substantially as described.

6. In combination with a cutter-shell and its tubular shaft, the bit and its shank arranged axially therein and connected to the shaft so as to revolve therewith and capable of reciprocating motion therein, and means for moving the bit longitudinally, and adjustable stops for limiting the movement of the bit or holding it in fixed position, substantially as described.

7. In combination with the cutter-shell, its stop, and the movable bit arranged in the shell, a carriage for holding the handle arranged to reciprocate toward the shell, and connections between the carriage and the bit-shank, substantially as described.

8. In combination, the cutter-shell, the axially-arranged bit, and the stop surrounding the bit and leaving a free space between itself and the bit for the escape of shavings, and an opening in the cutter-shell, substantially as described.

9. In combination, the cutter-shell formed with an opening, an axially-arranged bit, and a stop supported independently of the bit, with a free space between itself and the bit, substantially as described.

In testimony whereof I affix my signature in presence of two witnesses.

JAMES A. AIKEN.

Witnesses:
 HENRY E. EDWARDS,
 CHAS. E. SNOW.